United States Patent
Macours et al.

(10) Patent No.: US 9,661,198 B2
(45) Date of Patent: May 23, 2017

(54) VOICE COIL MOTOR DISPLACEMENT SENSOR AND CONTROLLER

(71) Applicant: NXP B.V., Eindhoven (NL)

(72) Inventors: Christophe Marc Macours, Leuven (BE); Shawn William Scarlett, Nijmegen (NL); Michael Joehren, San Jose (CA)

(73) Assignee: NXP B.V., Eindhoven (NL)

( * ) Notice: Subject to any disclaimer, the term of this patent is extended or adjusted under 35 U.S.C. 154(b) by 44 days.

(21) Appl. No.: 14/615,318

(22) Filed: Feb. 5, 2015

(65) Prior Publication Data

US 2015/0229814 A1   Aug. 13, 2015

(30) Foreign Application Priority Data

Feb. 13, 2014   (EP) .................................. 14155075

(51) Int. Cl.
  *H04N 5/232*   (2006.01)
  *H04N 5/225*   (2006.01)
  *H02P 6/18*   (2016.01)
  *H02P 25/034*   (2016.01)

(52) U.S. Cl.
  CPC ........... *H04N 5/2253* (2013.01); *H02P 6/183* (2013.01); *H02P 25/034* (2016.02)

(58) Field of Classification Search
  CPC ................................................. H04N 5/2253
  USPC ....................................................... 348/374
  See application file for complete search history.

(56) References Cited

U.S. PATENT DOCUMENTS

| 5,698,910 A * | 12/1997 | Bryant | H02K 11/225 310/12.04 |
| 2010/0225265 A1 | 9/2010 | Leis | |
| 2013/0087828 A1* | 4/2013 | Koshimizu | H01L 21/82385 257/139 |

FOREIGN PATENT DOCUMENTS

| CN | 102981855 A | | 3/2013 |
| JP | 2009-271204 A | | 11/2009 |
| JP | 2009271204 A | * | 11/2009 |
| KR | 10-1166418 B1 | | 7/2012 |
| KR | 101166418 B1 | * | 7/2012 |

OTHER PUBLICATIONS

Koifman, V. "Tessera on Drawbacks of VCM AF Actuators", 13 pgs., retrieved from the Internet at Feb. 5, 2015 http://image-sensors-world.blogspot.com/2011/07/tessera-on-drawbacks-of-vcm-af.html (Jul. 1, 2011).

Merit, B. et al. "Motor Nonlinearities in Electrodynamic Loudspeakers: Modelling and Measurement", Archives of Acoustics, vol. 34, No. 4, pp. 407-418 (2009).

(Continued)

*Primary Examiner* — Usman Khan
(74) *Attorney, Agent, or Firm* — Rajeev Madnawat

(57) ABSTRACT

A voice coil motor displacement sensor and a voice coil motor controller that uses said sensor. The sensor configured to apply an alternating measurement signal at a predetermined frequency to a voice coil motor, the sensor configured to use a measure of a voltage across and a current through the voice coil motor to determine its impedance at the predetermined frequency and determine an estimated displacement of said voice coil motor using said impedance and a predetermined displacement-impedance function.

16 Claims, 2 Drawing Sheets

(56) References Cited

OTHER PUBLICATIONS

Liu, C "Design and Characterization of Miniature Auto-Focusing Voice Coil Motor Actuator for Cell Phone Camera Applications", IEEE Trans. on Magnetics, vol. 45, No. 1, pp. 155-159 (Jan. 2009).

Hsu, J. et al. "Modeling and Design of a Voice-Coil Motor for Auto-Focusing Digital Using an Electromagnetic Simulation Software", IEEE Power Electronics Specialists Conf., pp. 939-944 (Jun. 2007).

Hsu, J. et al. Design and Implementation of a Voice-Coil Motor Servo Control IC for Auto-Focus Mobile Camera Applications, IEEE Power Electronics Specialists Conf., pp. 1357-1362 (Jun. 2007).

Yang, S. "On-Chip Voice-Coil Motor Driver for Mobile Auto-Focus Camera Applications", Asian Solid-State Circuits Conf., pp. 101-104 (Nov. 2005).

Zhang, X. et al. "A Signal Processing System on Chip for Digital Cameras", 26th Industrial Electronics Society, Annual Conf. of the IEEE, vol. 2, pp. 1243-1248 (2000).

Klippel, W. "Loudspeaker Nonlinearities—Causes, Parameters, Symptoms", 13 pgs., retrieved from the Internet at Feb. 5, 2015 http://www.klippel.de/uploads/media/Loudspeaker_Nonlinearities%E2%80%93Causes_Parameters_Symptoms_01.pdf.

Texas Instruments "Voice Coil Motor Driver for Camera Auto Focus", 24 pgs., retrieved from the Internet at: Feb. 5, 2015 http://www.ti.com/general/docs/lit/getliterature.tsp?genericPartNumber=drv201&fileType=pdf.

Extended European Search Report for EP Patent Appln. No. 14155075.6 (Jul. 3, 2014).

Chinese Office Action for Patent Appln. No. CN 201510080371.X (Jan. 6, 2016).

Hsu, J. et al. "Modeling and Design of a Voice-Coil Motor for Auto-Focusing Digital Using an Electromagnetic Simulation Software", IEEE Power Electronics Specialists Conf., pp. 939-944 (2007).

\* cited by examiner

VOICE COIL MOTOR DISPLACEMENT SENSOR AND CONTROLLER

CROSS-REFERENCE TO RELATED APPLICATIONS

This application claims the priority under 35 U.S.C. §119 of European patent application no. 14155075.6, filed on Feb. 13, 2014, the contents of which are incorporated by reference herein.

This invention relates to a voice coil motor displacement sensor. It also relates to a voice coil motor controller. It also relates to a lens focussing voice coil motor controller for a camera. Further, the invention relates to method of determining the displacement of a voice coil motor.

Many consumer electronics, such as mobile telephones, include camera functionality. Typically the camera includes an auto-focus (AF) capability. Auto focus requires precise motive control of a lens assembly to enable the camera to focus on a target object and provide a sharp image. It is common for AF systems to use Voice Coil Motors (VCM) to control the position of the lens assembly. VCMs are commonly used due to their small size, low cost and ease of implementation. It will be appreciated that VCMs also have application for positioning or actuating components in other electronic devices.

According to a first aspect of the invention we provide a voice coil motor displacement sensor, the sensor configured to apply an alternating measurement signal at a predetermined frequency to a voice coil motor, the sensor configured to use a measure of a voltage across and a current through the voice coil motor to determine its impedance at the predetermined frequency and determine an estimated displacement of said voice coil motor using said impedance and a predetermined displacement-impedance function.

This is advantageous as the displacement of the voice coil motor can be determined using an alternating measurement signal and a measure of the voltage and current parameters of the voice coil motor. Voice coil motors are typically driven by DC input signals and it has been found that application of an alternating measurement signal makes it possible to accurately determine the displacement of the motor without detrimentally affecting the operation of the motor. The sensor is therefore able to determine the impedance and, in particular, the inductance of the voice coil motor using the measurement signal and, using a predetermined function, determine an estimate of the motor's displacement.

The measurement signal may comprise a low amplitude (possibly in comparison to an input signal applied to the motor) and high frequency (above 2 kHz) signal that is applied to the voice coil motor or its driver circuit in addition to an input signal. The measurement signal provides an alternating signal for the sensor to measure in order to determine the impedance of the voice coil motor at a particular displacement.

Said measurement signal may comprise a tone of predetermined frequency. Said measurement signal may have a frequency outside of audible range. The measurement signal may have a frequency greater than 2 kHz. The measurement signal may have a frequency greater than four octaves above a resonance frequency of the voice coil motor. This is advantageous as a measurement signal of this frequency may avoid unwanted VCM motion. The resonance frequency of a VCM is, for example, typically in the range between 50 and 150 Hz. It will also be appreciated that the impedance-displacement relationship must be sufficiently present to be reliably measured in the frequency range chosen for the measurement signal.

The measurement signal may comprise a plurality of tones, each having a different frequency. The measurement signal may comprise noise introduced into the input signal over a particular frequency range.

According to a second aspect of the invention, we provide a voice coil motor controller for control of a voice coil motor of a camera, the controller including the voice coil motor displacement sensor of the first aspect of the invention and configured to control the displacement of the voice coil motor using the estimated displacement determined by the sensor.

This is advantageous as the motor controller can control the voice coil motor using a closed-loop feedback technique. This provides improved accuracy and speed of operation. As the motor controller only requires use of the sensor which measures the voltage across and the current through the voice coil motor to determine the estimated displacement, it can be cost-effective. The motor controller does not require input of other sensors, such as hall sensors or position sensors, as it is able to derive the estimated position from the voltage and current measurements alone using the sensor. It has been found that the control of the voice coil motor position can be advantageously improved by using the dependency of the voice coil motor inductance on its displacement derived from application of an alternating measurement signal. In operation, the voice coil motor will be mainly driven by DC or low frequency drive currents, and therefore characterisation of the displacement-impedance function for each voice coil motor position can be performed in advance and stored. The displacement-impedance function may comprise a look-up table of displacement vs voice coil impedance, which the controller may reference when it has determined the impedance. It will be appreciated that while the voice coil motor controller may be used for control of a voice coil motor of a camera, it may equally be used for other VCMs used to position components in other electronic devices.

The voice coil motor controller may be configured to apply an input signal to said voice coil motor to drive it to a target displacement. The input signal may comprise a DC input signal. Thus, the motor controller may initially determine a target displacement, such as from an auto-focus controller, which comprises an instruction to move the lens assembly associated with the voice coil motor to a particular position. This may be to bring an image into focus or for seeking a position of the lens assembly in which a resulting image is in focus.

The voice coil motor controller may be configured to combine the input signal with the alternating measurement signal of the sensor for supply to the voice coil motor. Thus, the determination by the sensor of the estimated displacement may occur during normal operation of the VCM.

The motor controller may be configured to receive a desired position, such as a desired lens assembly position from an auto-focus controller, said motor controller configured to determine an appropriate input signal to drive the voice coil motor to a target displacement corresponding to the desired position.

The motor controller may be configured to modify said input signal based on a difference between the target displacement and the estimated displacement. This is advantageous as the voice coil motor controller can use the sensor to determine how accurate the displacement of the voice coil motor was based on the initial input signal. If there is an offset from the target displacement, the input signal can be modified based on this feedback to move the voice coil motor so that it more accurately adopts the target displacement.

The motor controller may be configured to store the modification made to the input signal for subsequent determination of the input signal including said stored modification. Thus, the motor controller may include a table or function that associates target displacement and the input signal to apply to the voice coil motor or its driver circuit. Based on the feedback from the estimate displacement, the table or function may be modified. Thus, when the auto-focus controller next requests that the motor controller moves the voice coil motor to the particular target displacement, it can generate a more accurate input signal.

The motor controller may form part of an auto-focus controller. Thus, the motor controller may comprise a component part of an auto-focus controller for a camera configured to control the position of a lens assembly for focussing a camera.

According to a third aspect of the invention we provide method of determining a displacement of a voice coil motor, the method including the steps of;

applying an alternating measurement signal at a predetermined frequency to the voice coil motor;
measuring a voltage across and a current through the voice coil motor;
determining an impedance of the voice coil motor using said voltage and current measurements;
determining said displacement of the voice coil motor using said impedance and a predetermined displacement-impedance function.

This is advantageous as the displacement determined by the method is an estimate of the displacement of the voice coil motor which can be used for fault identification, control of the motor, diagnostics or other purposes.

The method may include the step of applying a DC input signal to the voice coil motor to drive it to a target position. The method may include the step of combining the DC input signal with the alternating measurement signal. The method may comprise a method of controlling a voice coil motor, such as a voice coil motor configured to position a lens assembly of a camera, the method comprising the step of controlling the displacement of the voice coil motor based in the determined displacement.

According to a fourth aspect of the invention we provide an integrated circuit (IC) including the voice coil motor displacement sensor of the first aspect or the voice coil motor controller of the second aspect or configured to perform the method of the third aspect.

According to a fifth aspect of the invention we provide an electronic device including the motor controller of the second aspect of the invention. the motor controller configured to control a voice coil motor associated with a lens assembly of a camera of said electronic device.

According to a sixth aspect of the invention, we provide a method of determining an impedance-displacement function for a voice coil motor, the method comprising;

i) applying an input signal to drive the voice coil motor to a particular displacement;
ii) applying an alternating measurement signal to the voice coil motor in addition to the input signal;
iii) measuring a voltage across and a current through the voice coil motor;
iv) determining an impedance of the voice coil motor using said voltage and current measurements;
v) measuring the actual displacement of the voice coil motor;
vi) associating the determined impedance and the actual displacement;
vii) repeating steps ii to vi with a different input signal.

There now follows, by way of example only, a detailed description of embodiments of the invention with reference to the following figures, in which.

Figure 1:
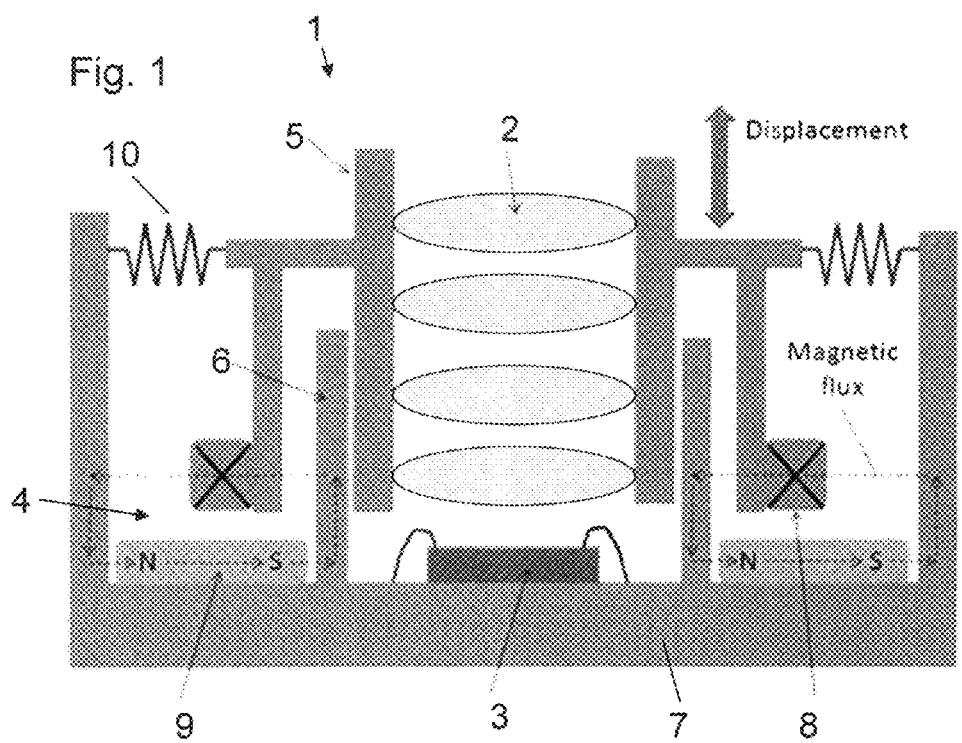
FIG. 1 shows a camera element having a lens assembly connected to a voice coil motor.

FIG. 1 shows a camera element 1 having a lens assembly 2 comprising a plurality of lenses. The position of the lens assembly 2 relative to an image sensor 3 is controlled by a voice coil motor 4. In particular, the lens assembly 2 is mounted within a turret 5 which is slidably mounted within a barrel 6. The barrel 6 extends from a housing 7, which includes the image sensor 3. The voice coil motor 4 includes a motive part 8, which in this example comprises an electromagnet, and a stationary part 9, which in this example comprises a permanent magnet, as is conventional. Application of an input signal to the electromagnet generates a magnetic field. The voice coil motor provides a motive force to the turret by current flowing through it providing a reaction in the presence of a magnetic field from the permanent magnet 9. The turret 5 is held in a default position relative to the barrel 6 by a spring assembly 10. The voice coil motor 4 thus provides a motive force against the force of the spring assembly 10 to displace the lens assembly 2 from its default position.

Figure 2:
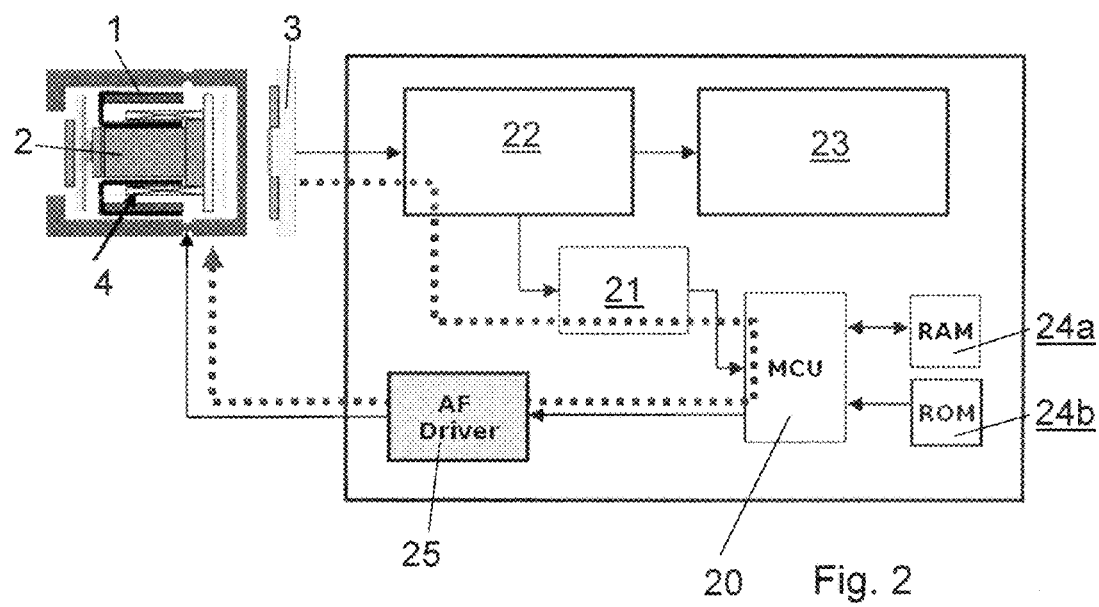
FIG. 2 shows a motor controller associated with an auto-focus controller.

FIG. 2 shows a voice coil motor controller 20, which includes a voice coil motor displacement sensor, and an auto-focus controller 21, which provide for control of the voice coil motor 4 of the camera element 1. It will be appreciated that while the sensor and controller are integrated in this embodiment, they may be provided as separate components. The motor controller 20 is shown in more detail in FIG. 3. The auto-focus controller 21 receives image data from an image processing element 22. The image processing element 22 receives input from the image sensor 3 to construct an image as captured by the image sensor 3 with the lens assembly in its current position. The image processing element 22 may be operatively connected to an image enhancement element 23, which provides for enhancement of the image. The auto-focus controller 21 interprets the image data to determine whether or not the image is in focus and therefore whether movement of the lens assembly 2 is required. The auto-focus controller 21 may use any known algorithm to perform this action. If movement of the lens assembly 2 is required, the auto-focus controller 21 provides a target displacement to the motor controller 20.

The motor controller 20 is embodied as a microcontroller, which is associated with memory 24a and 24b. The motor controller 20 provides a motor position signal to a voice coil driver 25 which uses the motor position signal to provide an appropriate driving signal to the voice coil motor 4 to displace the lens assembly 2 to the desired position (i.e. a displacement from its default position).

Figure 3:
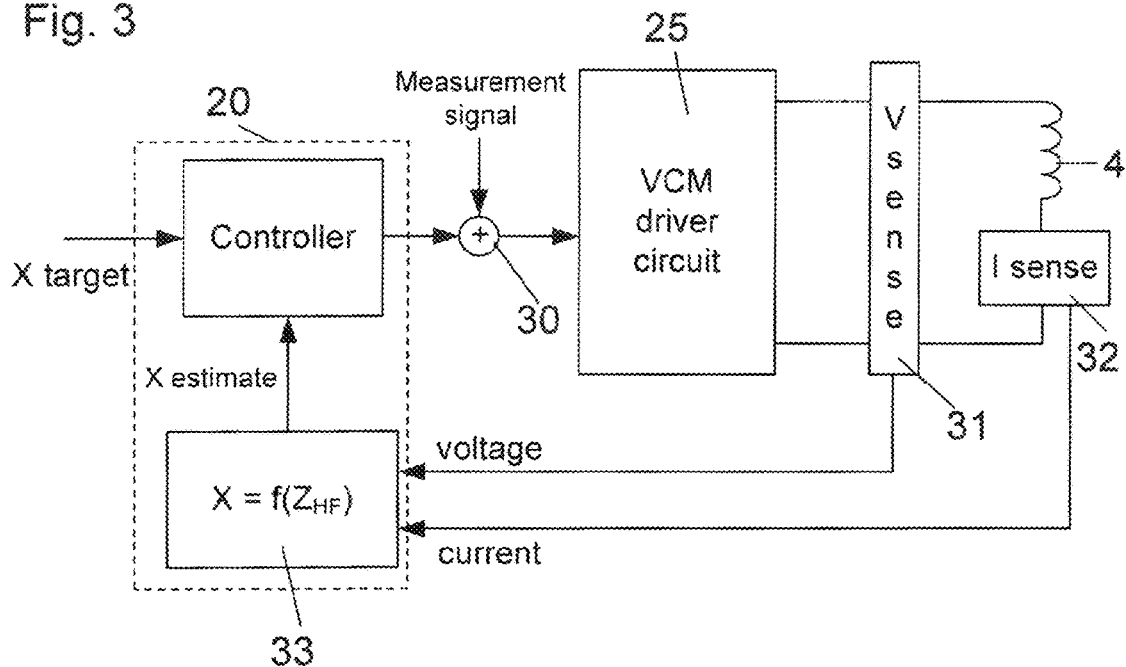
FIG. 3 shows an example motor controller.

With reference to FIG. 3, the controller 20 receives the target displacement. labelled "X target", from the auto-focus controller (not shown in FIG. 3). The controller 20 provides an appropriate motor position signal, which may be predetermined, which should cause the voice coil motor to move the lens assembly to the desired target displacement. The motor position signal is received by a mixer 30, which combines the motor position signal with a measurement signal. The measurement signal is used by the controller 20 to determine the position of the voice coil motor 4. In this example, the measurement signal comprises a signal having a frequency outside audible range, such as 25 kHz. The measurement signal does not interfere with the position to which the motor position signal is intended to move the voice coil motor 4. The measurement signal may be generated by the controller or the sensor that forms part of the controller. The combined motor position signal and measurement signal is received by the voice coil motor driver 25, which provides a drive signal of appropriate voltage/current to drive the voice coil motor 4. Due to manufacturing tolerances and other factors the actual position that the voice coil motor 4 is driven to in response to the motor position signal may deviate from the target position.

The displacement sensor of the controller 20 is configured to receive a measure of the voltage applied across the voice coil motor 4 from a voltage sensor 31. it will be appreciated that the output of the driver 25 may be measured to determine the voltage. Further, the displacement sensor of the controller 20 is configured to receive a measure of the current through the voice coil motor 4 from a current sensor 32.

The displacement sensor of the controller 20 is configured to use the voltage and current from the sensors 31, 32 to determine an impedance of the voice coil motor 4 at the frequency of the measurement signal. Thus, the measurement signal provides a voltage and current in a frequency range where the impedance-displacement relationship is present for the sensors 31, 32 to measure. It will be appreciated that the sensors 31, 32 may be configured to measure the voltage and current at the measurement signal frequency.

The displacement sensor of the controller 20 used a predetermined relationship between the voice coil impedance (in particular the inductance) and the position of the voice coil motor 4. Thus, the controller 20 receives the impedance-displacement function 33 from the memory 24b. The controller 20 determines a displacement estimate, X, of the actual displacement from a function of the impedance, Z, at the measurement signal frequency, HF, which is shown in FIG. 3 as $X=f(Z_{HF})$. The controller 20 is configured to compare the actual displacement, X estimate, with the target displacement, X target. In response to any offset between the estimated displacement and the target displacement, the controller may adjust the motor position signal so that the estimated position more closely aligns with the target position requested by the auto-focus controller 21. The magnitude of the offset may determine the amount by which the motor position signal is adjusted. Accordingly, the controller 20 utilises a closed-loop feedback arrangement and only a measure of the voltage and current electrical properties of the voice coil motor 4 to provide quick and accurate control of a voice coil motor and therefore a lens assembly position for an auto-focus function.

The controller 20 may record the adjustments made to the motor position signal for each target displacement to improve the accuracy of the lens positioning during use. The modifications may be stored in memory 24a.

Figure 4:
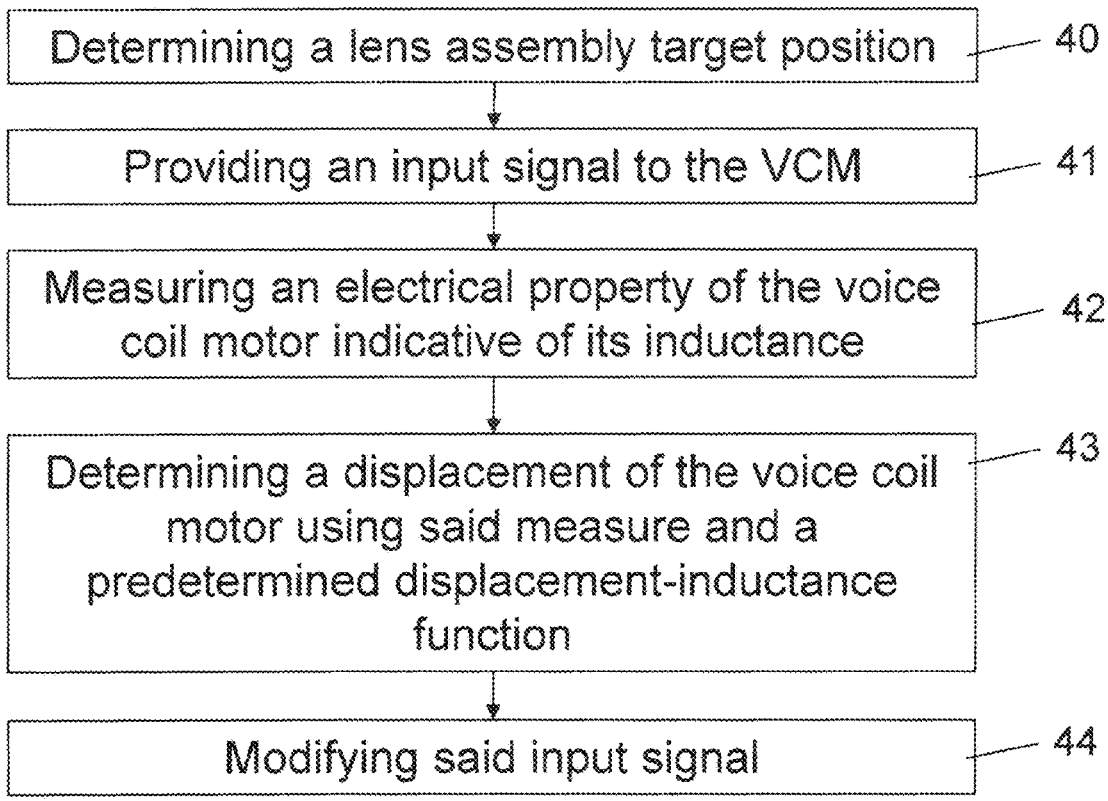
FIG. 4 shows a flow chart illustrating a method of determining the displacement of a lens assembly.

FIG. 4 shows a flowchart illustrating the auto-focus function with the improved positioning provided by the motor controller 20. Step 40 shows the auto-focus controller 21 determining a lens assembly target position. Step 41 shows the controller 20 using the target position to determine an appropriate motor position signal for the voice coil driver. Step 42 shows the step of the controller 20 measuring an electrical property of the voice coil motor indicative of its impedance, i.e. the voltage across and current through the voice coil motor. Step 43 shows the controller 20 determining a displacement of the voice coil motor using said measures and a predetermined displacement-impedance function 33. Step 44 then shows the controller modifying the motor position signal, if required, based on an offset between the target position and the estimated displacement determined in step 43.

In other embodiments, the measurement signal may comprise a sinusoidal signal of a predetermined frequency or a plurality of signals. The measurement signal may comprise a noise signal over a predetermined frequency range centred on a predetermined frequency. It will be appreciated that while we disclose the application of the motor controller to an auto-focus system of a camera, the motor controller can be used in any system that utilises a voice coil motor. Further, although the embodiment shows a voice coil motor controller in combination with the displacement sensor, it will be appreciated that the displacement sensor may be distinct from the controller and may provide an estimated displacement for purposes other than control of the motor. For example, the displacement sensor may be used for determining the displacement following application of an input signal to identify faults in the voice coil motor or its controller.

The invention claimed is:

1. A voice coil motor displacement sensor used to measure a voice coil motor displacement and a lens assembly position, the sensor configured to apply an alternating measurement signal at a predetermined frequency to a voice coil motor, the sensor configured to use a measure of a voltage from a voltage sensor across the voice coil motor and a current from a current sensor through the voice coil motor to determine its impedance at the predetermined frequency and determine an estimated displacement of said voice coil motor and the lens assembly position using said impedance and a predetermined displacement-impedance function.

2. A sensor according to claim 1, wherein said alternating measurement signal has a predetermined frequency outside of audible range.

3. A sensor as defined in claim 1, wherein the measurement signal has a frequency greater than 2 kHz.

4. A sensor as defined in claim 1, wherein the measurement signal comprises a plurality of tones, each having a different frequency.

5. A sensor as defined in claim 1, wherein the measurement signal comprises noise over a particular frequency range.

6. A voice coil motor controller for control of a voice coil motor of a camera, the controller including the voice coil motor displacement sensor of claim 1, and configured to control the displacement of the voice coil motor using the estimated displacement determined by the sensor.

7. A voice coil motor controller as defined in claim 6, configured to apply an input signal to said voice coil motor to drive it to a target displacement.

8. A voice coil motor controller as defined in claim 7, configured to combine the input signal with the alternating measurement signal of the sensor for supply to the voice coil motor.

9. A voice coil motor controller as defined in claim 7, wherein said motor controller is configured to receive a desired position, said motor controller configured to determine a value of said input signal to drive the voice coil motor to a target displacement corresponding to the desired position.

10. A voice coil motor controller as defined in claim 9, in which the motor controller is configured to modify said input signal based on a difference between the target displacement and the estimated displacement.

11. A voice coil motor controller as defined in claim 10, in which the controller is configured to store the modification made to the input signal for subsequent determination of the input signal from a desired target displacement including said stored modification.

12. A voice coil motor controller as defined in claim 6, in which the voice coil motor controller comprises an auto-focus controller of a camera configured to control the position of the lens assembly for focusing a camera.

13. The voice coil motor controller as defined in claim 1, wherein the voice coil motor displacement sensor or voice coil motor controller is included within an integrated circuit.

14. An electronic device including the voice coil motor controller of claim 6, the motor controller configured to control a voice coil motor associated with a lens assembly of a camera of said electronic device.

15. A method of determining a displacement of a voice coil motor and a lens assembly position, the method including the steps of; applying an alternating measurement signal at a predetermined frequency to the voice coil motor; measuring a voltage from a voltage sensor across the voice coil motor and a current from a current sensor through the voice coil motor; determining an impedance of the voice coil motor using said voltage and current measurements; determining said displacement of the voice coil motor and the lens assembly position using said impedance and a predetermined displacement-impedance function.

16. The method of claim 15, wherein the method of determining a displacement of a voice coil motor and a lens assembly position is performed within an integrated circuit.

* * * * *